US006660321B2

(12) United States Patent
Efstathiou

(10) Patent No.: US 6,660,321 B2
(45) Date of Patent: Dec. 9, 2003

(54) FROZEN CONCENTRATED LIQUID WHOLE EGG AND METHOD OF MAKING SAME

(75) Inventor: John D. Efstathiou, Plymouth, MN (US)

(73) Assignee: Cargill, Incorporated, Minneapolis, MN (US)

( * ) Notice: Subject to any disclaimer, the term of this patent is extended or adjusted under 35 U.S.C. 154(b) by 0 days.

(21) Appl. No.: 09/894,982

(22) Filed: Jun. 27, 2001

(65) Prior Publication Data

US 2003/0012859 A1 Jan. 16, 2003

(51) Int. Cl.⁷ .................................. A23L 1/32
(52) U.S. Cl. .................. 426/614; 426/521; 426/524
(58) Field of Search .............................. 426/614, 521, 426/524

(56) References Cited

U.S. PATENT DOCUMENTS

| | | | |
|---|---|---|---|
| 2,476,412 A | * | 9/1949 | Harris |
| 2,776,214 A | | 1/1957 | Lloyd et al. |
| 3,364,037 A | | 1/1968 | Mink et al. |
| 3,565,638 A | | 2/1971 | Ziegler et al. |
| 3,615,705 A | | 10/1971 | Kohl et al. |
| 3,656,534 A | * | 4/1972 | Bain et al. |
| 3,840,683 A | | 10/1974 | Strong et al. |
| 3,843,811 A | | 10/1974 | Seeley |
| 3,857,974 A | | 12/1974 | Aref et al. |
| 3,911,144 A | | 10/1975 | Strong et al. |
| 3,928,632 A | | 12/1975 | Glaser et al. |
| 3,958,035 A | | 5/1976 | Stearns et al. |
| 4,382,973 A | | 5/1983 | de Figueiredo et al. |
| 4,388,340 A | | 6/1983 | de Figueiredo et al. |
| 4,409,249 A | | 10/1983 | Forkner |
| 4,524,083 A | | 6/1985 | Liot |
| 4,877,625 A | * | 10/1989 | Dieu et al. |
| 5,266,338 A | | 11/1993 | Cascione et al. |
| 5,455,054 A | | 10/1995 | Bryson et al. |
| 5,487,912 A | | 1/1996 | Meibach et al. |
| 5,741,539 A | | 4/1998 | Knipper et al. |
| 5,807,597 A | | 9/1998 | Barnes et al. |
| 5,846,585 A | | 12/1998 | Ohmura et al. |
| 6,162,441 A | * | 12/2000 | Chae et al. |
| 6,348,230 B1 | * | 2/2002 | Campbell et al. |
| 2002/0114876 A1 | * | 8/2002 | Campbell et al. |

FOREIGN PATENT DOCUMENTS

| | | |
|---|---|---|
| CA | 964921 | 3/1975 |
| GB | 1376972 | 12/1976 |
| GB | 2086708 | 5/1982 |
| JP | 55144846 | 11/1980 |
| JP | 56169542 | 12/1981 |
| JP | 5068476 | 3/1993 |
| JP | 6098722 | 4/1994 |
| JP | 7255369 | 10/1995 |
| JP | 9275843 | 10/1997 |
| JP | 10313826 | 12/1998 |
| WO | WO 96/23424 | 7/1996 |
| WO | WO 00/19843 | 4/2000 |

* cited by examiner

*Primary Examiner*—Anthony J. Weier
(74) *Attorney, Agent, or Firm*—Fitch, Even, Tabin & Flannery

(57) ABSTRACT

The invention is directed to a frozen concentrated liquid whole egg product and a process for making the frozen concentrated product. The product has from about 33 to about 49 weight solids, from about 51 to about 67 weight percent water and a viscosity at 40° F. of from about 1,000 to about 5,000 cps before or after thawing. The process includes heating liquid whole egg for a time and temperature which are effective for not coagulating the egg.

13 Claims, No Drawings

FROZEN CONCENTRATED LIQUID WHOLE EGG AND METHOD OF MAKING SAME

FIELD OF THE INVENTION

This invention is directed to a frozen concentrated liquid whole egg product and a process for making the frozen concentrated product.

BACKGROUND OF THE INVENTION

Supplying, shipping and using large volumes of liquid egg products with extended shelf lives creates problems for both user and supplier. A supplier desires a product which is not only resistant to spoilage, but is cheaper to ship, uses less packaging than liquid whole egg, and uses less space for storage when stored by the supplier and/or user. Prior to the invention, no one has addressed the problem of not only reducing the volume of liquid whole egg being shipped to commercial users of egg products such as restaurants, but also maintaining and/or increasing the shelf life of eggs being used and shipped to large volume users of liquid egg products. Heretofore, prior workers have cooked eggs and frozen them or have separately frozen whites and yolks. These products do not address or help those who desire to freshly cook eggs and those who do not desire to mix eggs and whites prior to cooking.

U.S. Pat. No. 4,388,340 to deFigueiredo et al. describes placing egg yolks and whites in separate containers for heating which will cause evaporation of water, but the heating when complete causes coagulation of the yolks and whites. Thereafter the yolks and whites are rapidly frozen. See also U.S. Pat. No. 4,382,973 to deFigueiredo et al. which also describes heating to coagulation and thereafter freezing. U.S. Pat. No. 3,958,035 to Sterns et al. describes a method of manufacturing an "omelette-type" egg product where the egg whites and yolks have water added to adjust the level of water in the egg, such that the mix has from about 75–85 percent water by weight. The patent notes that whole eggs have a moisture level of about 75 weight percent and additional moisture is added to the mix. The egg product is heated to "set the egg product in the shape of a pan." The "set product" then is frozen. U.S. Pat. No. 3,565,638 to Ziegler et al. describes adding water and gum with other ingredients to egg, pasteurizing the egg, and then freezing same. U.S. Pat. No. 3,364,037 to Mink et al. describes treating egg whites with peroxide and thereafter freezing the egg whites. See also U.S. Pat. No. 5,266,338 to Cascione et al. U.S. Pat. No. 4,409,249 to Forkner describes separating yolks from whites, pasteurizing the yolk and whites, freezing the yolk (see FIG. 2 at 29), and freezing the whites. U.S. Pat. No. 3,857,974 to Aref et al., together with U.K. patent 1 376 972, and Canadian Patent No. 964921 describe the fast freezing egg white, egg yolk, or egg white and yolk.

SUMMARY OF THE INVENTION

The invention is directed to a frozen concentrated liquid whole egg product and a method for making such product. The frozen concentrated product is concentrated liquid whole egg which has at least about 33 weight percent solids and not more than about 67 weight percent water. After concentration the concentrated liquid whole egg has a viscosity at about 40° F. prior to freezing or after thawing of not less than about 1,000 cps. Generally, before freezing or after thawing, the liquid whole egg product of the invention has from about 33% solids to about 49 weight percent solids without the addition of supplemental ingredients such as salt or sugar, from about 67 to about 51 weight percent water and a viscosity of from about 1,000 to about 5,000 cps at about 40° F. The frozen concentrated liquid egg product has a temperature of not more than about 10° F., and generally from about −10° F. to about 10° F. For use, the frozen product is thawed and then reconstituted with water to have a moisture level of from about 77.5 weight percent to about 75.5 weight percent.

According to the process of the invention, liquid whole egg product is concentrated to a solids level (without the addition of supplemental ingredients) of at least about 33 weight percent with heat at a temperature and for a time which are effective for not substantially coagulating the egg and which are effective for removing water from the liquid whole egg such that the egg will have such solids level. Generally the liquid whole egg will be concentrated to a solids level of from about 33 to about 49 weight percent, from about 51 to about 67 weight percent water and a viscosity at about 40° F. of from about 1,000 to about 5,000 cps. Generally, after heating the liquid whole egg, the egg is concentrated from about 1.5 times to about 2.1 times. After concentration, the concentrated liquid whole egg product is frozen to a temperature of from about −10° F. to about 10° F. to provide the frozen concentrated liquid whole egg product of the invention.

In one aspect of the invention, liquid whole egg is concentrated by passing it over a plate, generally more than once, and gradually raising the temperature of the egg, evaporating water and increasing the solids level with each pass. In this aspect, the temperature of the plate of the evaporating plate is sufficiently close to the temperature of the egg so that "hot spots" will not develop such that the protein in the egg will not denature or coagulate. In this aspect, the egg generally will be preheated to a temperature before it is exposed to an evaporation device, such as a plate evaporator, so that the temperature difference between the preheated egg and the plate evaporator will not be so great as to denature or coagulate the protein in the egg.

DETAILED DESCRIPTION OF THE INVENTION

Definitions

As used herein, "not coagulated" or "not coagulating" may be determined by particle size, and the mean particle size of the egg particles after water evaporation is not more than about 2.75 to about 11 microns for their largest dimension. Generally, not coagulating liquid whole egg is a function of time and temperature the liquid egg is exposed to heat. Concentrated liquid whole egg which is not coagulated will be substantially the same, when reconstituted with water, as liquid whole egg such that the taste, color, baking and other organoleptic properties of the reconstituted concentrated egg will be substantially the same as liquid whole egg. Another measure of determining the acceptability of the concentrated egg after concentration is that the viscosity of the concentrated liquid egg should not be more than about 5000 cps. at 40° F. without the addition of thickeners or thinners which would affect the viscosity of the egg at about 33 to about 49 weight percent egg solids. At a viscosity of over 5,000 cps, the egg becomes unacceptably pasty.

"Liquid whole egg" means egg white and yolk in the ratio which is generally recognized as the ratio of yolk to white in shell eggs. That ratio generally is in the range of from about 1 part yolk to about 2 parts egg white. Liquid whole egg generally has about 23.5 weight percent solids and 76.5 weight percent water.

The frozen concentrated product is concentrated liquid whole egg which has at least about 33 weight percent solids, not more than about 67 weight percent water and a viscosity at about 40° F. prior to freezing of not less than about 1,000 cps. In one aspect, the concentrated liquid whole egg is not coagulated prior to freezing. In another aspect for large commercial applications, the liquid whole egg may be pasteurized either before or after concentration so that it may exhibit an extended shelf life after thawing. Before or after freezing the concentrated liquid whole egg product of the invention has from about 33 to about 49 weight percent solids without the addition of supplemental ingredients, such as salt or sugar, from about 67 to about 51 weight percent water and a viscosity of from about 1,000 to about 5,000 cps at about 40° F.

To make the frozen liquid whole egg product, water is gently removed from the egg to provide a solids level of at least about 33 weight percent solids. The solids level of liquid whole egg generally is about 23.5 weight percent before concentration. After evaporation of water in the liquid whole egg, the solids level of the concentrated egg is at least 33 weight percent, and in one aspect is as high as about 49 weight percent with such solids level being obtained without coagulating or "cooking" the liquid whole egg to provide the concentrated liquid whole egg.

In practicing the method of the invention to make the concentrated liquid whole egg, the egg is first pre-heated in a pre-heater, such as a plate pre-heater. Pre-heating brings cool liquid whole egg having a temperature of about 40° F. to a temperature of at least about 100° F., and preferably to about 125° F. After pre-heating, the liquid whole egg is transported to an evaporator, such as a rising/falling plate evaporator where the pre-heated egg product is gradually heated to temperatures as high as 130° F. The pre-heated egg is exposed to the plate and to such a temperature for about 8 to about 10 seconds as it is heated in stages. Other evaporation devices, such as a batch pan evaporator, a tubular evaporator (natural circulation tubular, rising film tubular and falling film tubular evaporator), forced circulation evaporator, wiped film evaporator, and rising/falling film plate evaporator all may be used to practice the invention.

The plate in the evaporator is heated with a liquid medium, such as water, having a temperature in the range of from about 145 to about 160° F. Water in the egg is evaporated gradually by gradually heating and evaporating the water in the egg in stages. The surface of the plate has a temperature of about 105° F. to about 130° F. as the liquid whole egg passes over in it a first pass or stage where exposure of the egg to the plate in the plate heater is for about 8 to about 10 seconds. After the first pass or stage the egg treated in the first stage has a solids level of about 33 weight percent and may be held in a surge tank until it is redirected over the same or another evaporator plate having a surface temperature of about 105° F. to about 130° F. for about 8 to about 10 seconds. After such a second pass, the resulting concentrated egg will have a solids level of about 42 weight percent. The egg may be continually subjected to such evaporation treatment, such as a third pass, until the solids level of about 33 to about 49 weight percent is reached. The temperature difference between the egg and evaporation plate should not be more than about 3° F. to about 6° F. This avoids overheating of the egg and denaturization and/or coagulation of the protein in the egg. The time and temperature of the pre-heating, the evaporation, and the number of "passes" through the evaporator should be effective for providing a solids level for the liquid whole egg to at least about 33 weight percent, and generally to about 49 weight percent or more without cooking or coagulating the resulting concentrated liquid whole egg. The thickness of the stream of egg flowing over the plate also has to be controlled so that the temperature of the egg flowing over the plate will not be substantially different such that a large temperature gradient does not develop over the thickness of the egg depending upon how far a particular egg particle is from the plate of the plate evaporator. The thickness of the egg flowing over the plate for commercial applications generally may be about 3 mm with the egg being heated in three stages in a rising/falling plate evaporator to a temperature of about 130° F. for about 8 to about 10 seconds per stage at a flow rate of from about 1.5 to about 4 grams per minute. Generally in three passes, the liquid whole egg may be concentrated to about 49 weight percent solids by heating it at about 130° F. for about 24 to about 30 seconds. The egg passing over the plate of the plate evaporator and the plate of the plate of the evaporator comprise a system which is substantially isothermal.

Before or after the concentration of the egg, the egg may be pasteurized by various known methods, such as those set forth in the *Egg Pasteurization Manual* published by the U.S.D.A. (140° F. for 3-½ minutes hold time). After pasteurization the pasteurized product generally has less than about 1000 plate count per gram of concentrated product, less than about 10 *E. coli* and coliforms per gram of concentrated product, negative salmonellae and negative listeria.

After the water has been evaporated from the liquid whole egg, the resulting concentrated egg is frozen. This may be generally done by exposing the concentrated egg to temperatures of from about −10° F. to about −20° F. using known equipment.

EXAMPLE

Equipment

100 Gallon Processing Tank.

Junior Rising/Falling Film with two passes in the evaporator.

Process

Liquid whole eggs are pumped into a 100-gallon cone bottom tank. The product is then pumped into a plate evaporator and is heated in a plate pre-heater to temperatures that vary from 100° F. to 124° F.–125° F. The pre-heated product then leaves the plate pre-heater and enters the plate evaporator and is evaporated with a water or steam heating the plate in the plate evaporator. The heating water has a temperature which on the average is about 155° F.–160° F.

On the first pass, the product is concentrated from about 26 to 31 degrees brix. In a second pass the product is concentrated to about 31 to 35 degrees brix. In the third pass, the product increases to about 35 to about 40–41 degrees brix. The product is recirculated such that the solids of the product increase to about 46.5 and then finally to about 48 percent. At about 48 weight percent solids, the concentrated liquid whole egg product begins to become quite plastic in nature and not very flowable.

| | 1st Pass egg start | | | | | 2nd Pass | | | | | | | | |
|---|---|---|---|---|---|---|---|---|---|---|---|---|---|---|
| Time | 10:00 AM | 10:05 AM | 10:30 AM | 11:00 AM | 11:30 AM | 11:45 AM | 2:30 PM | 3:00 PM | 3:05 PM | 3:10 PM | 3:14 PM | 3:18 PM | 3:25 PM | 3:30 PM |
| Feed (°Brix) | water | 26.5 | 26.5 | 31 | 31 | | 36 | 37 | | | | | | |
| Concentrate (°Brix) | | 32 | 31 | 35.5 | 35 | 37 | 37 | 39 | 41 | 43 | 44 | 46.5 | 46 | 46 |
| Feed Rate (gpm) | 3 | | 1.5 | 2 | 2 | 2 | 4 | 4 | 3.75 | | | 4 | 4.25 | 4.25 |
| Steam Temp (° F.) | 130 | | 148 | 158 | 158 | 200* | 126 | 152 | 158 | | | 161 | 160 | 161 |
| Steam Press ("Hg) | 21 | | 16 | 15 | 15 | 0 | 21.5 | 16.5 | | | | | | |
| Vapor Temp (° F.) | 98 | | 98 | 98 | 98 | 98 | 93 | 93 | 92 | | | 93 | 92 | 92 |
| Vapor Press ("Hg) | 26 | | 26 | 26 | 26 | 26 | 27 | 27 | | | | | | |
| Evap. Rate (lb/hr) | 372 | | 348 | 278 | 264 | | 156 | 120 | 120 | | | 96 | | 84 |
| Feed Temp (° F.) Recirc. GCV | 120 | | 100 | 94 | 104 | 106 | 111 | 113 | 120 | | | 124 | | 126 |
| CW in (° F.) | 50 | | 50 | 50 | 50 | 50 | 50 | 50 | | | | | | |
| CW out (° F.) | 70 | | 67 | 66 | 66 | 66 | 58 | 58 | | | | | | |

11:45 AM - Steam Temp. @200° F.
Between 11:45 AM and 2:30 PM - breakdown/check plates/suspect fouling.
2:45 PM - Loss of power (vacuum), foam over.
*Represents a failure in the run.

What is claimed is:

1. A frozen concentrated liquid whole egg having not more than about 67 weight percent water, from about 33% to about 49% solids and a viscosity at about 40° F. after thawing of from about 1,000 to about 5,000 cps, wherein the liquid whole egg is not coagulated before freezing and wherein after thawing the concentrated liquid whole egg product has less than about 1000 plate count per gram of concentrated egg, less than about 10 *E. coli* and coliforms per gram of concentrated egg, negative salmonellae and negative listeria.

2. The frozen concentrated liquid egg as recited in claim 1 wherein the frozen concentrated liquid egg has a temperature of from about −10° F. to about 10° F.

3. A frozen concentrated liquid whole egg which is made from liquid whole egg by
    heating the liquid whole egg for a time and temperature which are effective for not coagulating the egg and which are effective for removing water from the liquid whole egg such that the egg will be concentrated from about 1.5 to about 2.1 times to provide a non-coagulated concentrated liquid whole egg; and
    freezing the concentrated liquid whole egg to provide the frozen concentrated liquid whole egg,
    the frozen concentrated liquid whole egg having a mean particle size after thawing of not more than about 11 microns and from about 33% to about 49% solids,
    wherein after thawing the concentrated liquid whole egg product has less than about 1000 plate count per gram of concentrated egg, less than about 10 *E. coli* and coliforms per gram of concentrated egg, negative salmonellae and negative listeria.

4. The frozen concentrated liquid whole egg as recited in claim 3 wherein the concentrated egg is frozen at a temperature of from about −10° F. to about 10° F.

5. A frozen concentrated liquid whole egg which is made from liquid whole egg by
    heating liquid whole egg for a time and temperature which are effective for removing water from the liquid whole egg such that the egg will have from about 33% to about 49% weight percent solids, from about 51 to about 67 weight percent water and a viscosity at about 40° F. of from about 1,000 to about 5,000 cps to provide a non-coagulated concentrated liquid whole egg; and
    freezing the concentrated liquid whole egg to provide the frozen concentrated liquid whole egg,
    wherein after thawing the concentrated liquid whole egg product has less than about 1000 plate count per gram of concentrated egg, less than about 10 *E. coli* and coliforms per gram of concentrated egg, negative salmonellae and negative listeria.

6. The frozen concentrated liquid whole egg as recited in claim 5, wherein the concentrated liquid whole egg is frozen at a temperature of from about −10° F. to about 10° F.

7. A frozen concentrated liquid whole egg which is made from liquid whole egg by
    passing a film of liquid whole egg over the surface of a plate evaporator to heat the liquid whole egg for a time and temperature which are effective for not coagulating the egg and which are effective for removing water from the liquid whole egg such that the egg will have from about from about 33% to about 49 weight percent solids, from about 51 to about 67 weight percent water, and a viscosity at about 40° F. of from about 1,000 to about 5,000 cps to provide a concentrated liquid whole egg; and
    freezing the concentrated liquid whole egg to provide a frozen concentrated liquid whole egg,
    wherein after thawing the concentrated liquid whole egg product has less than about 1000 plate count per gram of concentrated egg, less than about 10 *E. coli* and coliforms per gram of concentrated egg, negative salmonellae and negative listeria.

8. The frozen concentrated liquid whole egg as recited in claim 7, wherein the liquid whole egg is heated for about 24 to about 30 seconds at a temperature of not more than about 130° F.

9. The frozen concentrated liquid whole egg as recited in claim 7, wherein the concentrated liquid whole egg is frozen at a temperature of from about −10° F. to about 10° F. to provide the frozen concentrated liquid whole egg.

10. The frozen concentrated liquid whole egg as recited in claim 8, wherein the egg is pre-heated to a temperature of at least 130° F. before the egg is passed over the plate heat evaporator.

11. A frozen concentrated liquid whole egg having not more than about 51 weight percent water, a viscosity of not more than about 5000 cps at about 40° F., a mean particle size after thawing of not more than about 11 microns and from about 33% to about 49% solids, wherein the liquid whole egg is not coagulated before freezing, wherein after thawing the concentrated liquid whole egg product has less than about 1000 plate count per gram of concentrated egg, less than about 10 *E. coli* and coliforms per grams of concentrated egg, negative salmonellae and negative listeria.

12. A frozen concentrated liquid whole egg having a mean particle size after thawing of not more than about 11 microns and from about 33% to about 49% solids, less than about 1000 plate count per gram of concentrated product, less than about 10 *E. coli* and coliforms per gram of concentrated product, negative salmonellae and negative listeria and after thawing a viscosity at about 40° F. of from about 1,000 to about 5,000 cps.

13. The frozen concentrated whole egg as recited in claim 1 wherein concentrated egg does not have more than about 51 weight percent water.

* * * * *